United States Patent
Dubey et al.

(10) Patent No.: US 10,360,366 B1
(45) Date of Patent: Jul. 23, 2019

(54) SYSTEMS AND METHODS FOR PROVIDING TWO-FACTOR AUTHENTICATION WITH AN ENTERPRISE GATEWAY WHEN AN AUTHENTICATION SERVER IS UNAVAILABLE

(71) Applicant: Symantec Corporation, Mountain View, CA (US)

(72) Inventors: Sankalp Dubey, Agra Uttar Pradesh (IN); Srinath Venkataramani, Karnataka (IN); Vadiraj Kulkarni, Karnataka (IN); Kunal Agarwal, Mountain View, CA (US)

(73) Assignee: Symantec Corporation, Mountain View, CA (US)

( * ) Notice: Subject to any disclaimer, the term of this patent is extended or adjusted under 35 U.S.C. 154(b) by 107 days.

(21) Appl. No.: 15/706,612

(22) Filed: Sep. 15, 2017

(51) Int. Cl.
| | |
|---|---|
| *G06F 21/40* | (2013.01) |
| *H04L 9/32* | (2006.01) |
| *H04L 12/24* | (2006.01) |
| *G06F 21/62* | (2013.01) |
| *H04L 29/06* | (2006.01) |

(52) U.S. Cl.
CPC .............. *G06F 21/40* (2013.01); *H04L 9/321* (2013.01); *H04L 9/3271* (2013.01); *H04L 41/0663* (2013.01); *G06F 21/62* (2013.01); *H04L 63/0884* (2013.01); *H04L 63/18* (2013.01)

(58) Field of Classification Search
CPC ...................................................... H04L 9/321
See application file for complete search history.

(56) References Cited

U.S. PATENT DOCUMENTS

| | | | |
|---|---|---|---|
| 8,667,281 B1 | 3/2014 | Chenna | |
| 8,689,294 B1* | 4/2014 | Thakur | ................... H04L 63/08 |
| | | | 713/182 |
| 8,640,213 B2 | 12/2014 | Najafi et al. | |
| 9,313,185 B1 | 4/2016 | Pei | |
| 9,355,231 B2* | 5/2016 | Disraeli | .................. G06F 21/31 |
| 9,402,181 B1 | 7/2016 | Yi et al. | |
| 9,438,604 B1* | 9/2016 | Addala | ................. H04L 9/3226 |
| 2013/0227677 A1* | 8/2013 | Pal | ........................... G06F 21/33 |
| | | | 726/19 |
| 2016/0132946 A1* | 5/2016 | Bate | .................... G06Q 30/0609 |
| | | | 705/26.35 |
| 2017/0324737 A1* | 11/2017 | Evans | ................. H04L 63/0884 |

\* cited by examiner

*Primary Examiner* — Josnel Jeudy
(74) *Attorney, Agent, or Firm* — FisherBroyles, LLP

(57) ABSTRACT

The disclosed computer-implemented method for providing two-factor authentication with an enterprise gateway when an authentication server is unavailable may include (1) receiving, at a computing device, an authentication request from a client device; (2) determining the authentication server is unavailable; (3) sending, to the client device and in response to determining the authentication server is unavailable, a backup credential stored on the enterprise gateway; (4) receiving, from the client device, a security code generated by the backup credential; (5) authenticating the security code; (6) sending, in response to determining the security code is authentic, access approval to the client device. The provided methods may provide authentication, by an enterprise gateway, of one or more factors in a multi-factor authentication system when an authentication server is unavailable. Various other methods, systems, and computer-readable media are also disclosed.

20 Claims, 7 Drawing Sheets

SYSTEMS AND METHODS FOR PROVIDING TWO-FACTOR AUTHENTICATION WITH AN ENTERPRISE GATEWAY WHEN AN AUTHENTICATION SERVER IS UNAVAILABLE

BACKGROUND

Security is often described as a continuum between convenience and safety. A system that requires ten layers of authentication may be very difficult to attack, but it may also be so inconvenient that it will never be used. At the opposite end, a system with no means of authentication or authorization is highly convenient for users but also highly insecure. Many security systems now offer two-factor authentication, which requires an additional piece of information beyond or in place of the traditional username and password combination. Some two-factor authentication systems may involve using an authentication server to perform a portion of the login process.

One downside of two-factor authentication systems that involve authentication servers is that access to the authentication servers may be lost. Access may be lost due to network outages and/or failures of the authentication servers. Thus, access loss either leads to the two-factor authentication system becoming a one-factor authentication system or locks-out users attempting authentication. The instant disclosure, therefore, identifies and addresses a need for systems and methods for providing two-factor authentication with an enterprise gateway when an authentication server is unavailable.

SUMMARY

As will be described in greater detail below, the instant disclosure describes various systems and methods for providing two-factor authentication with an enterprise gateway when an authentication server is unavailable.

In one example, a method for providing two-factor authentication with an enterprise gateway when an authentication server is unavailable may include (1) receiving, at the computing device, an authentication request from a client device; (2) determining the authentication server is unavailable; (3) sending, to the client device and in response to determining the authentication server is unavailable, a backup credential stored on the enterprise gateway; (4) receiving, from the client device, a security code generated by the backup credential; (5) authenticating the security code; (6) sending, in response to determining the security code is authentic, access approval to the client device. In some examples, sending the backup credential to the client device includes sending the backup credential via an out-of-band channel.

In some embodiments, the method may include checking availability of the authentication server. In some examples, the method may include switching, in response to determining the authentication server is available, to using the authentication server for authentication.

The method may also include, when the authentication server is available and prior to unavailability of the authentication server: (1) receiving a key pair from the authentication server; (2) determining that the backup credential is not bound to the client device; (3) sending a request for the backup credential to the authentication server, wherein the request includes a shared secret encrypted with the key pair; (4) receiving confirmation that the backup credential is registered; and (5) storing the backup credential.

In some embodiments, the method may include registering the credential at the authentication server, where registering the credential includes (1) decrypting the shared secret using the key pair; (2) sending, to a mobile device, an authentication message with an option to grant or deny the backup credential; (3) receiving a response, from the mobile device, indicating acceptance of the backup credential; (4) registering the backup credential; and (5) sending, to the enterprise gateway, the confirmation that the backup credential is registered. The method may also include using a password to encrypt the shared secret and deriving the key pair from the password.

In some embodiments, the method may include (1) identifying, in response to the authentication request from the client device, a potential security risk associated with the authentication request; and (2) performing, in response to identifying the potential security risk, a security action in an attempt to ameliorate the potential security risk.

In one embodiment, a system for providing two-factor authentication with an enterprise gateway when an authentication server is unavailable may include several modules stored in memory, including (1) a first receiving module that receives, at the computing device, an authentication request from a client device; (2) a determining module that determines the authentication server is unavailable; (3) a first sending module that sends, to the client device and in response to determining the authentication server is unavailable, a backup credential stored on the enterprise gateway; (4) a second receiving module that receives, from the client device, a security code generated by the backup credential; (5) an authenticating module that authenticates the security code; and (6) a second sending module that sends, in response to determining the security code is authentic, access approval to the client device; and at least one physical processor that executes the first receiving module, the determining module, the first sending module, the second receiving module, the authenticating module, and the second sending module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) receive, at the computing device when an authentication server is unavailable, an authentication request from a client device; (2) determine the authentication server is unavailable; (3) send, to the client device and in response to determining the authentication server is unavailable, a backup credential stored on the enterprise gateway; (4) receive, from the client device, a security code generated by the backup credential; (5) authenticate the security code; and (6) send, in response to determining the security code is authentic, access approval to the client device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification.

Together with the following description, these drawings demonstrate and explain various principles of the instant disclosure.

Figure 1:
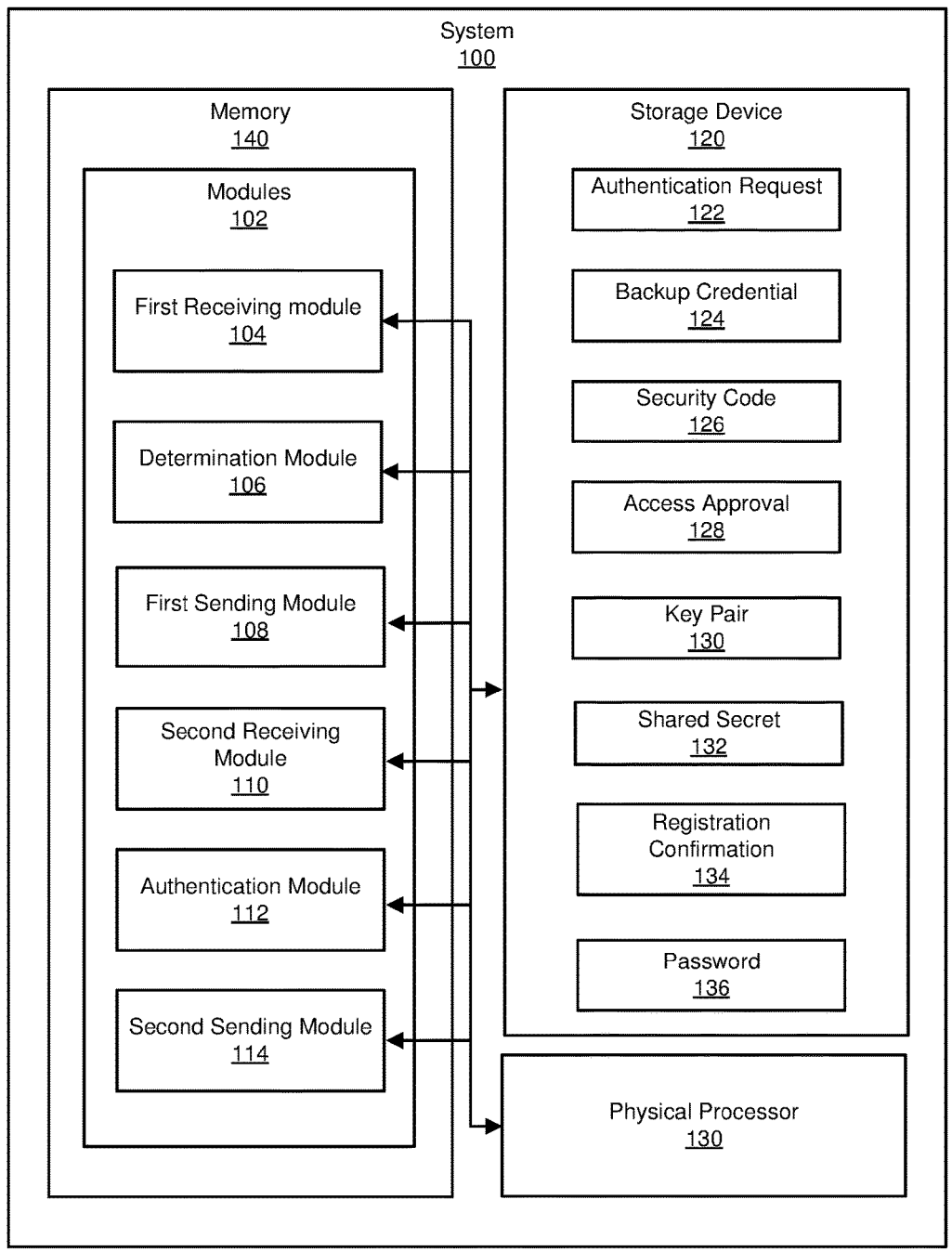
FIG. 1 is a block diagram of an example system for providing two-factor authentication with an enterprise gateway when an authentication server is unavailable.

Throughout the drawings, identical reference characters and descriptions indicate similar, but not necessarily identical, elements. While the example embodiments described herein are susceptible to various modifications and alternative forms, specific embodiments have been shown byway of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for providing two-factor authentication with an enterprise gateway when an authentication server is unavailable. As will be explained in greater detail below, by establishing a backup credential prior to losing availability of an authentication server, an enterprise gateway may authenticate access to a client device during a login process when the authentication server is inaccessible. Additionally, the methods and systems described herein may communicate backup credentials via an out-of-band channel to a known mobile device of the user attempting access to enhance confidence of the multi-factor authentication process in an absence of the authentication server.

In addition, the systems and methods described herein may improve the functioning of a computing device by automatically supporting multi-factor authentication when an authentication server is unavailable. These systems and methods may also improve the fields of computer protection by improving authentication processes. Thus, the disclosed systems and methods may provide additional asset protection for common targets of unauthorized access, such as hospitals, shipping companies, financial companies, governments, etc. by providing multi-factor authentication when an authentication server is unavailable. In addition, the systems and methods described herein may thwart an insider attack involving cutting access to an authentication server and hacking a single-factor authentication situation resulting from the unavailability of the authentication server—thus enhancing asset protection.

Figure 2:
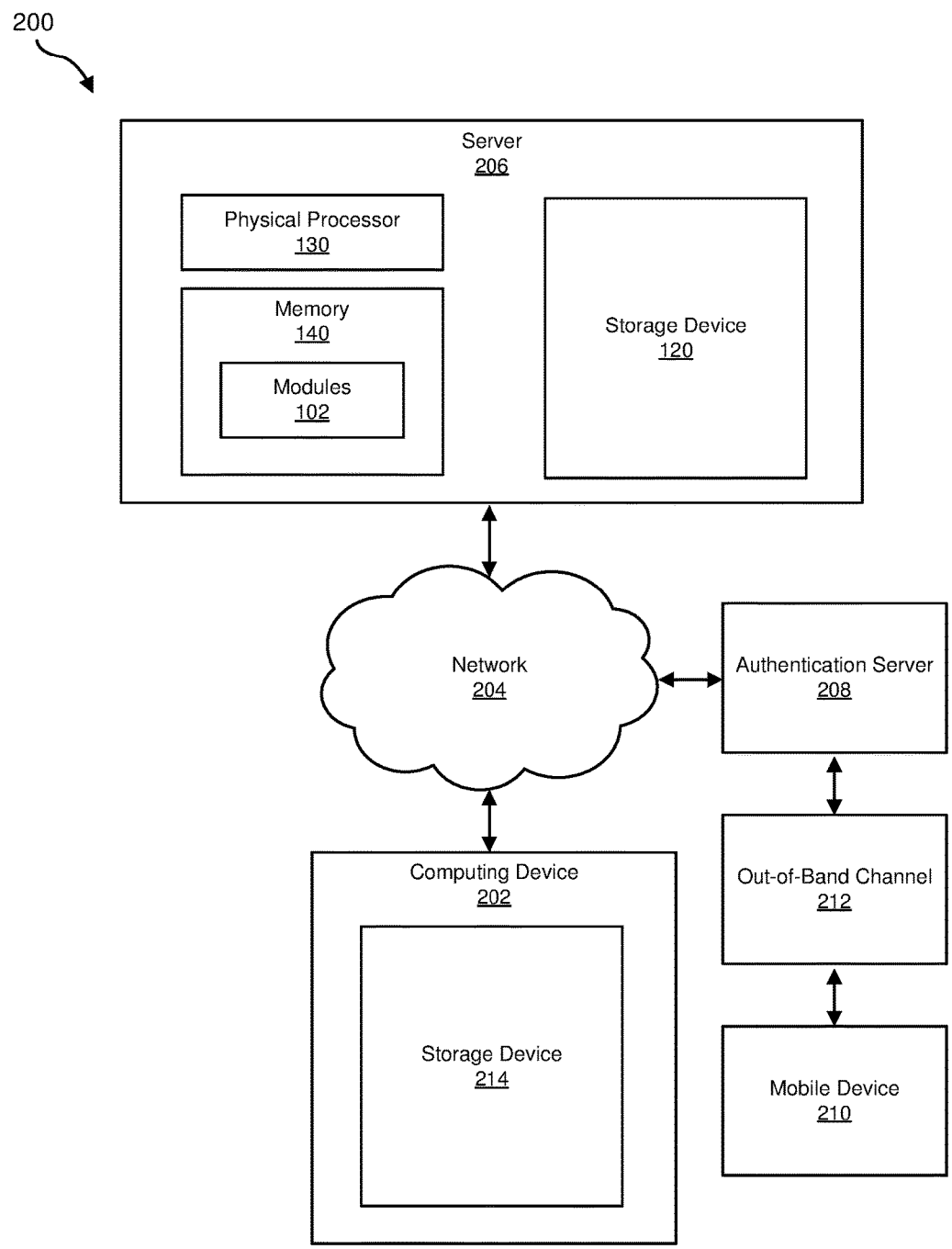
FIG. 2 is a block diagram of an additional example system for providing two-factor authentication with an enterprise gateway when an authentication server is unavailable.

The following will provide, with reference to FIGS. 1-2, detailed descriptions of example systems for providing two-factor authentication with an enterprise gateway when an authentication server is unavailable. Detailed descriptions of corresponding computer-implemented methods will also be provided in connection with FIG. 3. Detailed descriptions of example flow diagrams of provisioning a user backup credential and authenticating a user with a backup credential when an authentication server is unavailable are provided in connection with FIGS. 4 and 5. In addition, detailed descriptions of an example computing system and network architecture capable of implementing one or more of the embodiments described herein will be provided in connection with FIGS. 6 and 7, respectively.

FIG. 1 is a block diagram of an example system 100 for providing two-factor authentication with an enterprise gateway when an authentication server is unavailable. As illustrated in this figure, example system 100 may include one or more modules 102 for performing one or more tasks. As will be explained in greater detail below, modules 102 may include a first receiving module 104, a determination module 106, a first sending module 108, a second receiving module 110, an authentication module 112, and a second sending module 114. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202, server 206, authentication server 208, and/or mobile device 210). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate providing two-factor authentication with an enterprise gateway when an authentication server is unavailable. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more storage devices, such as storage device 120. Storage device 120 generally represents any type or form of volatile or non-volatile storage device or medium capable of storing data and/or computer-readable instructions. In one example, storage device 120 may store, load, and/or maintain one or more of authentication request 122, backup credential 124, security code 126, access approval 128, key pair 130, shared secret 132, registration confirmation 134, and/or password 136. Examples of storage device 120 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with server 206 via network 204. Network 204 is also coupled to an authentication server 208, which in turn is coupled to a mobile device 210 via an out-of-band channel 212. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to providing two-factor authentication with an enterprise gateway when an authentication server is unavailable. For example, and as will be described in greater detail below, one or more of modules 102 may cause computing device 202 and/or server 206 to (1) receive, at server 206, authentication request 122 from computing device 202; (2) determine authentication server 208 is unavailable; (3) send, to computing device 202 and in response to determining authentication server 208 is unavailable, backup credential 124 stored on server 206; (4) receive, from computing device 202, security code 126 generated by backup credential 124; (5) authenticate security code 126; and (6) send, in response to determining security code 126 is authentic, access approval 128 to computing device 202.

Computing device 202 generally represents any type or form of computing device capable of reading computer-executable instructions. For example, computing device 202 may represent an endpoint device running client-side software. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, Internet-of-Things devices (e.g., smart appliances, etc.), variations or combinations of one or more of the same, and/or any other suitable computing device.

As illustrated in FIG. 2, computing device 202 may also include one or more storage devices, such as storage device 214. Storage device 214 generally represents any type or form of volatile or non-volatile storage device or medium capable of storing data and/or computer-readable instructions. In one example, storage device 214 may store, load, and/or maintain one or more of authentication request 122, backup credential 124, security code 126, access approval 128, key pair 130, shared secret 132, registration confirmation 134, and/or password 136. Examples of storage device 214 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

Network 204 generally represents any medium or architecture capable of facilitating communication or data transfer. In one example, network 204 may facilitate communication between computing device 202, server 206, and authentication server 208. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Server 206 generally represents any type or form of computing device that reads computer-executable instructions. For example, server 206 may represent an enterprise gateway device running server-side software, such as an enterprise gateway that services authentication requests when authentication server 208 is unavailable. In examples, server 206 is within an enterprise data center. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Authentication server 208 generally represents any type or form of computing device that reads computer-executable instructions. In examples, authentication server 208 is a cloud-based server hosting cloud-based validation and internet protocol protection (i.e., VIP authentication service) software as a service (SaaS). The cloud-based VIP software may provide two-factor authentication based on what a user knows (e.g., a password) and what a user has (e.g., a security code pushed to a mobile device). For example, authentication server 208 may represent an authentication server device running server-side software that services authentication requests and provisions backup credential 124 when authentication server 208 is available. Additional examples of authentication server 208 include, without limitation, security servers, application servers, web servers, storage servers, and/or database servers configured to run certain software applications and/or provide various security, web, storage, and/or database services. Although illustrated as a single entity in FIG. 2, authentication server 208 may include and/or represent a plurality of servers that work and/or operate in conjunction with one another.

Mobile device 210 generally represents any type or form of portable computing device capable of reading computer-executable instructions. Examples of mobile device 210 include, without limitation, laptops, tablets, e-readers, cellular phones, smart phones, Personal Digital Assistants (PDAs), wearable devices (e.g., smart watches, smart glasses, etc.), and/or combinations of one or more of the same. In some embodiments, mobile device 210 may include an application that provides an interface allowing a user to provision backup credential 124 via out-of-band channel 212. Other out-of-band communications may be also performed using mobile device 206.

Out-of-Band Channel 212 generally represents a communication channel other than a communication link provided by network 204. Examples of out-of-band channel 212 include, without limitation, wireless communication systems (e.g., CDMA (Code Division Multiple Access) systems, TDMA (Time Division Multiple Access) systems, FDMA (Frequency Division Multiple Access) systems, and OFDMA (Orthogonal Frequency Division Multiple Access) systems), circuit switched voice communication systems (e.g., public switched telephone network (PSTN)), packet-switched communication systems (e.g., Wi-Fi, wireless local area networks (WLAN), local area network (LAN)), and the like.

As illustrated in FIG. 2, computing device 202 may also include one or more storage devices, such as storage device 214. Storage device 214 generally represents any type or form of volatile or non-volatile storage device or medium capable of storing data and/or computer-readable instructions. In one example, storage device 214 may store, load, and/or maintain one or more of authentication request 122, backup credential 124, security code 126, access approval 128, key pair 130, shared secret 132, registration confirmation 134, and/or password 136. Examples of storage device 214 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

Figure 3:
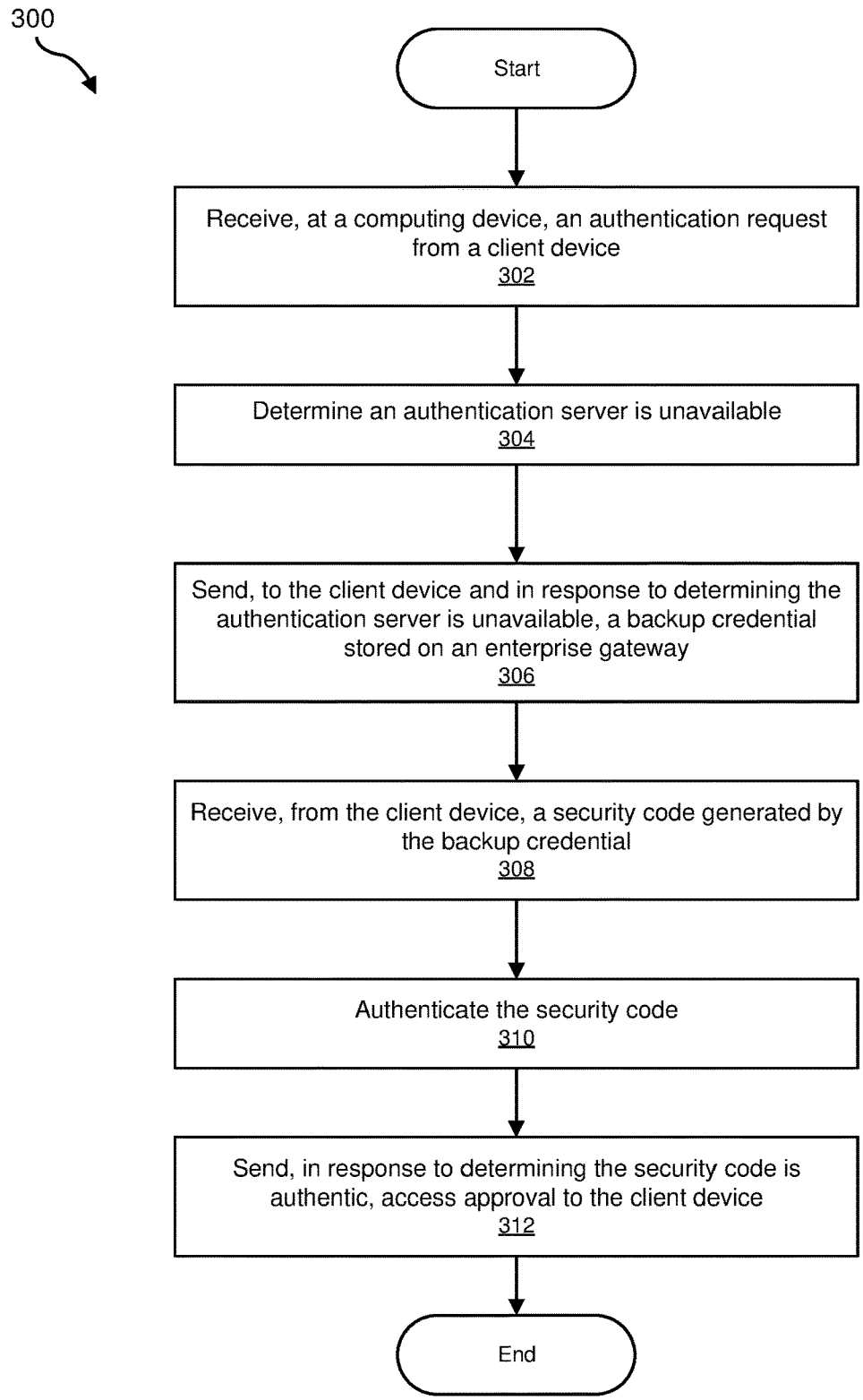
FIG. 3 is a flow diagram of an example method for providing two-factor authentication with an enterprise gateway when an authentication server is unavailable.

FIG. 3 is a flow diagram of an example computer-implemented method 300 for providing two-factor authentication with an enterprise gateway when an authentication server is unavailable. In examples, the authentication server may be unavailable when connectivity from within enterprises (e.g., via an enterprise gateway) to a SaaS cloud (for any cloud) becomes unavailable for various uncontrollable reasons. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As is descried in further detail herein, one or more of the systems described herein may provide user authentication with an enterprise gateway when an authentication server is unavailable. For example, modules 102 may, as part of server 206 in FIG. 2, receive, at server 206, authentication request 122 from computing device 202; determine authentication server 208 is unavailable; and send, to computing device 202 and in response to determining authentication server 208 is unavailable, backup credential 124 stored on server 206. Modules 102 may also, as part of server 206 in FIG. 2, receive, from computing device 202, security code 126 generated by backup credential 124; authenticate security code 126; and send, in response to determining security code 126 is authentic, access approval 128 to computing device 202.

In some examples, a potential security risk associated with the process may be identified, in response to the authentication request from the client device, and, in response to identifying the potential security risk, a security action may be performed in an attempt to ameliorate the potential security risk. For example, first receiving module 104 may identify a potential security risk associated with authentication request 122 and in response perform a security action in an attempt to ameliorate the potential security risk. The security action may include stopping computer-implemented method 300. The security action may also include notifying authentication server 208 of the potential security risk associated with authentication request 122.

As used herein, the term "backup credential" may refer to any authentication factor and/or information used to derive an authentication factor. In some examples, the term "backup credential" may refer to a shared secret. Additionally or alternatively, the term "backup credential" may refer to information which, in combination with information already possessed by a device, allows the device to derive a shared secret. For example, the term "backup credential" may refer to a one-time-password credential that may be used to derive one or more one-time passwords.

As illustrated in FIG. 3, at step 302 one or more of the systems described herein may receive, at a computing device, an authentication request from a client device. For example, first receiving module 104 may, as part of server 206 in FIG. 2, receive authentication request 122 from computing device 202.

The term "request," as used herein, generally refers to any communication sent from a computing device to another computing device. In some examples, a request may be sent from a computing device to an enterprise gateway device. In other examples, a request may be sent from a computing device to an authentication system as part of multi-factor authentication. Additionally or alternatively, a request may be sent by an authentication server to a mobile push service. In one example, a request may be sent by a computing device indicating that an authentication system should initiate a multi-factor authentication process.

The term "multi-factor authentication," as used herein, generally refers to any type of authentication process that involves more than one factor. In some embodiments, a multi-factor authentication process may involve multiple computing devices. For example, a multi-factor authentication process launched from a desktop computer may require a user to supply a username and/or password and may also require the user to authorize the login attempt from an additional device linked to their user account in order to log in.

Returning to FIG. 3, at step 304, one or more of systems described herein may determine the authentication server is unavailable. In some additional embodiments, one or more of systems described herein may check availability of the authentication server. The authentication server may be unavailable for any of a number of reasons, such as a network failure, server failure, connectivity failure, cloud outage, etc. For example, determination module 106 may, as part of server 206 in FIG. 2, determine authentication server 208 is unavailable. In some examples, determination module 106 may determine authentication server 208 is unavailable by sending a ping to authentication server 208 and determining that authentication server 208 did not respond to the ping within a defined time period.

Returning to FIG. 3, at step 306, one or more of systems described herein may send, to the client device and in response to determining the authentication server is unavailable, a backup credential stored on the enterprise gateway. In additional examples, the backup credential is sent to the client device via an out-of-band channel. For example, first sending module 108 may, as part of server 206 in FIG. 2, send to computing device 202 and in response to determining authentication server 208 is unavailable, backup credential 124 stored on server 206.

In additional examples, the backup credential may be provisioned when the authentication server is available and prior to unavailability of the authentication server. The provisioning may include the enterprise gateway receiving a key pair from the authentication server, the enterprise gateway determining that the backup credential is not bound to the client device, and the enterprise gateway sending a request for the backup credential to the authentication server. In examples, the request may include a shared secret encrypted with the key pair. The enterprise gateway may use a password may to encrypt the shared secret, and may derive the key pair from the password. Provisioning may also include the enterprise gateway receiving confirmation from the authentication server that the backup credential is registered and the enterprise gateway storing the backup credential in a storage device at the enterprise gateway. The provisioning may also include the authentication server registering the backup credential by decrypting the shared secret using the key pair. The authentication server may use the password to decrypt the shared secret and may derive the key pair from the password. The provisioning may also include the authentication server sending, to a mobile device, an authentication message with an option to grant or deny the backup credential. Further, the provisioning may also include receiving a response from the mobile device indicating acceptance of the backup credential (e.g., by a user); registering the backup credential. Moreover, the provisioning may include sending, from the authentication server to the enterprise gateway, confirmation that the backup credential is registered.

The term "Out-of-Band Channel" generally represents a communication channel other than a communication link provided by network 204. Some examples of an out-of-band channel include, without limitation, wireless communication systems (e.g., CDMA (Code Division Multiple Access) systems, TDMA (Time Division Multiple Access) systems, FDMA (Frequency Division Multiple Access) systems, and OFDMA (Orthogonal Frequency Division Multiple Access) systems), circuit switched voice communication systems (e.g., public switched telephone network (PSTN)), packet-switched communication systems (e.g., Wi-Fi, wireless local area networks (WLAN), local area network (LAN)), and the like. Some examples of an out-of-band channel include, without limitation, short-message service (SMS) systems, voice communication systems, email communication systems, etc. In some embodiments, a system administrator controls access to an out-of-band channel.

The term "out-of-band authentication communication," as used herein, generally refers to any communication sent between authentication server 208 and mobile device 210 via an out-of-band channel and that enables provisioning backup credential 124.

Returning to FIG. 3, at step 308, one or more of systems described herein may receive, from the client device, a security code generated by the backup credential. In examples, security code 126 may be a one-time password (OTP) generated from backup credential 124 and used to authenticate when authentication server 208 is unavailable. For example, second receiving module 110 may, as part of server 206 in FIG. 2, receive, from computing device 202, security code 126 generated by backup credential 124.

Returning to FIG. 3, at step 310, one or more of systems described herein may authenticate the security code. For example, authentication module 112 may, as part of server 206 in FIG. 2, authenticate security code 126.

Returning to FIG. 3, at step 312, one or more of systems described herein may send, in response to determining the security code is authentic, access approval to the client device. In some additional embodiments, one or more of systems described herein may subsequently check availability of the authentication server and switch, in response to determining the authentication server is available, to using the authentication server for authentication. For example, second sending module 114 may, as part of server 206 in FIG. 2, send, in response to determining security code 126 is authentic, access approval 128 to computing device 202.

Figure 4:
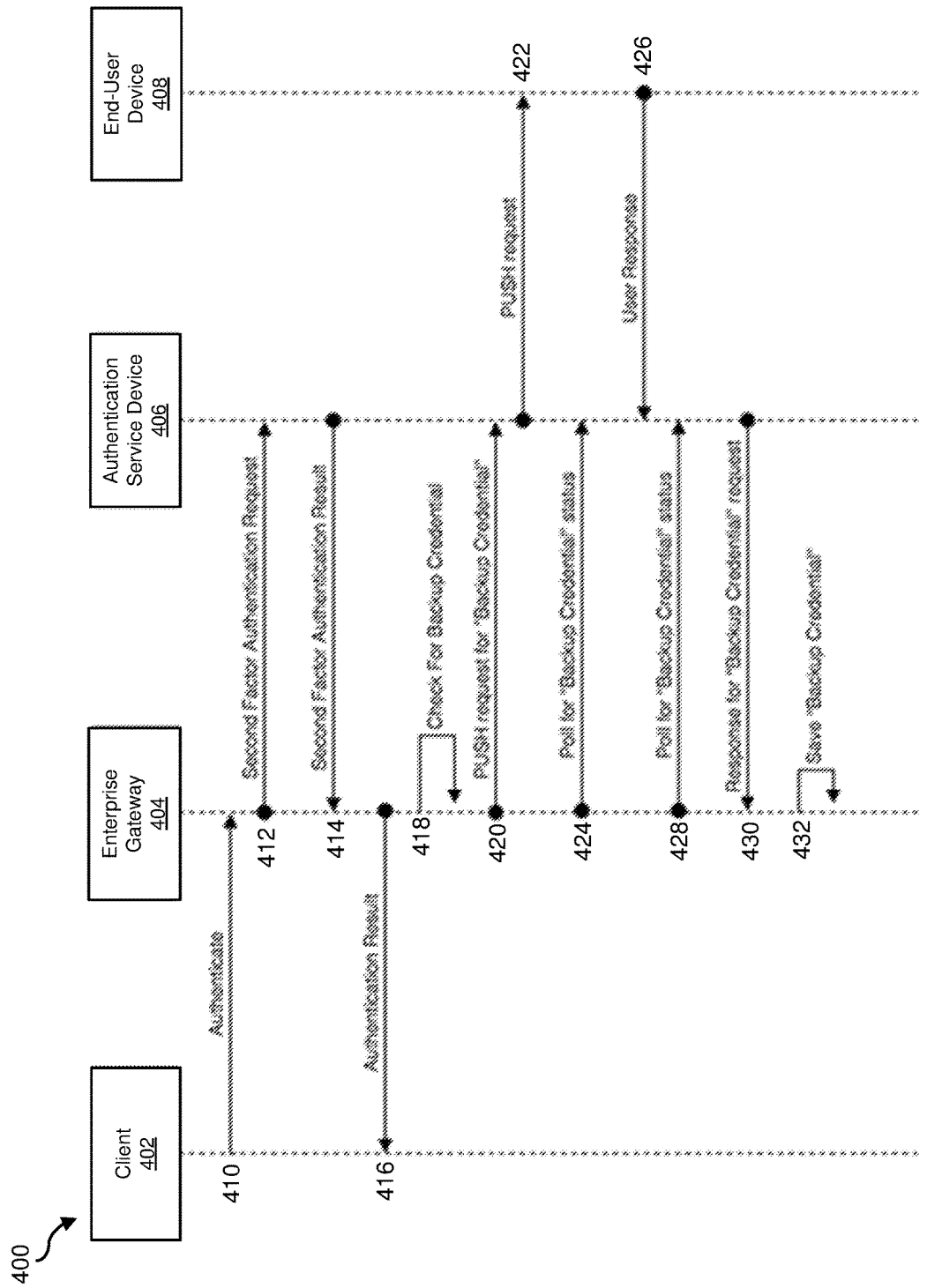
FIG. 4 is a flow diagram of an example method for provisioning a user backup credential.

FIG. 4 is a flow diagram 400 of an example method for provisioning a backup credential by binding a strong authentication credential to a user account. In examples, flow diagram 400 may provision the backup credential only when an authentication server is available and through an out-of-band push mechanism. Strong authentication is achieved by validating a security code generated from authentication credentials. In some examples, flow diagram 400 is a first stage of a two-stage method for providing two-factor authentication with an enterprise gateway when an authentication server is unavailable.

As shown in FIG. 4, flow diagram 400 may include a client device 402 in communication with an enterprise gateway 404. Enterprise gateway 404 is also coupled to an authentication service device 406, which in turn is coupled to end-user device 408. In examples, all or a portion of the client device 402 may be performed by computing device 202 and/or any other suitable computing system. In one example, all or a portion of the functionality of enterprise gateway 404 may be performed by server 206 and/or any other suitable computing system. In some embodiments, all or a portion of the functionality of authentication service device 406 may be performed by authentication server 208 and/or any other suitable computing system. In examples, all or a portion of the functionality of end-user device 408 may be performed by mobile device 210 and/or any other suitable computing system. In one example, all or a portion of the functionality of modules 102 may be performed by enterprise gateway 404 and/or any other suitable computing system. As will be described in greater detail herein, one or more of modules 102 from FIG. 1 may, when executed by at least one processor of enterprise gateway 404 to providing two-factor authentication with an enterprise gateway when an authentication server is unavailable.

As illustrated in FIG. 4, at step 410, an authentication message may be sent from client device 402 to enterprise gateway 404.

At step 412, a key pair may be generated and shared between enterprise gateway 404 and authentication service device 406. The key pair may be used to subsequently encrypt and decrypt a shared secret.

At step 418, after an initial successful authentication of a user using an authentication credential, enterprise gateway 404 may check whether backup credential is bound to the user.

At step 420, when a user does not have a backup credential bound to his/her account, enterprise gateway 404 may send an encrypted shared secret as part of a PUSH request to authentication service device 406. Authentication service device 406 may decrypt the shared secret using the key pair previously shared with enterprise gateway 404.

At step 422, in response to the PUSH request from enterprise gateway 404, authentication service device 406 may send a PUSH authentication message to end-user device 408 with an option to Grant or Deny registering the backup credential. Authentication service device 406 may send the PUSH authentication message to end-user device 408 via an out-of-band channel such as a short message system, a voice channel, or via email. To register a backup credential, a user may have to grant and/or accept the PUSH message from authentication service device 406.

At step 424, enterprise gateway 404 may poll authentication service device 406 for status of backup credential registration. In an example depicted in step 424, end-user device 408 has not responded to the PUSH request.

At step 426, a user response to the PUSH request may be sent by end-user device 408 to authentication service device 406. In some examples, after successful registration of a backup credential, the security code generated from the backup credential may be displayed on the end-user device 408. Strong authentication may be achieved by validating the security code generated from authentication credentials in authentication service device 406.

At step 428, enterprise gateway 404 may poll authentication service device 406 for status of backup credential registration. In some examples, end-user device 408 has responded to the PUSH request by registering the backup credential, which confirms the end-user device 408 is a trusted device which may be used for subsequent authenticating a user with a backup credential when an authentication server is unavailable.

At step 430, authentication service device 406 may respond to enterprise gateway 404 with status of backup credential registration indicating successful registration of the backup credential.

At step 432, registration is successful, and the encrypted shared secret may be stored as an attribute of a user record at authentication service device 406 and/or enterprise gateway 404.

Figure 5:
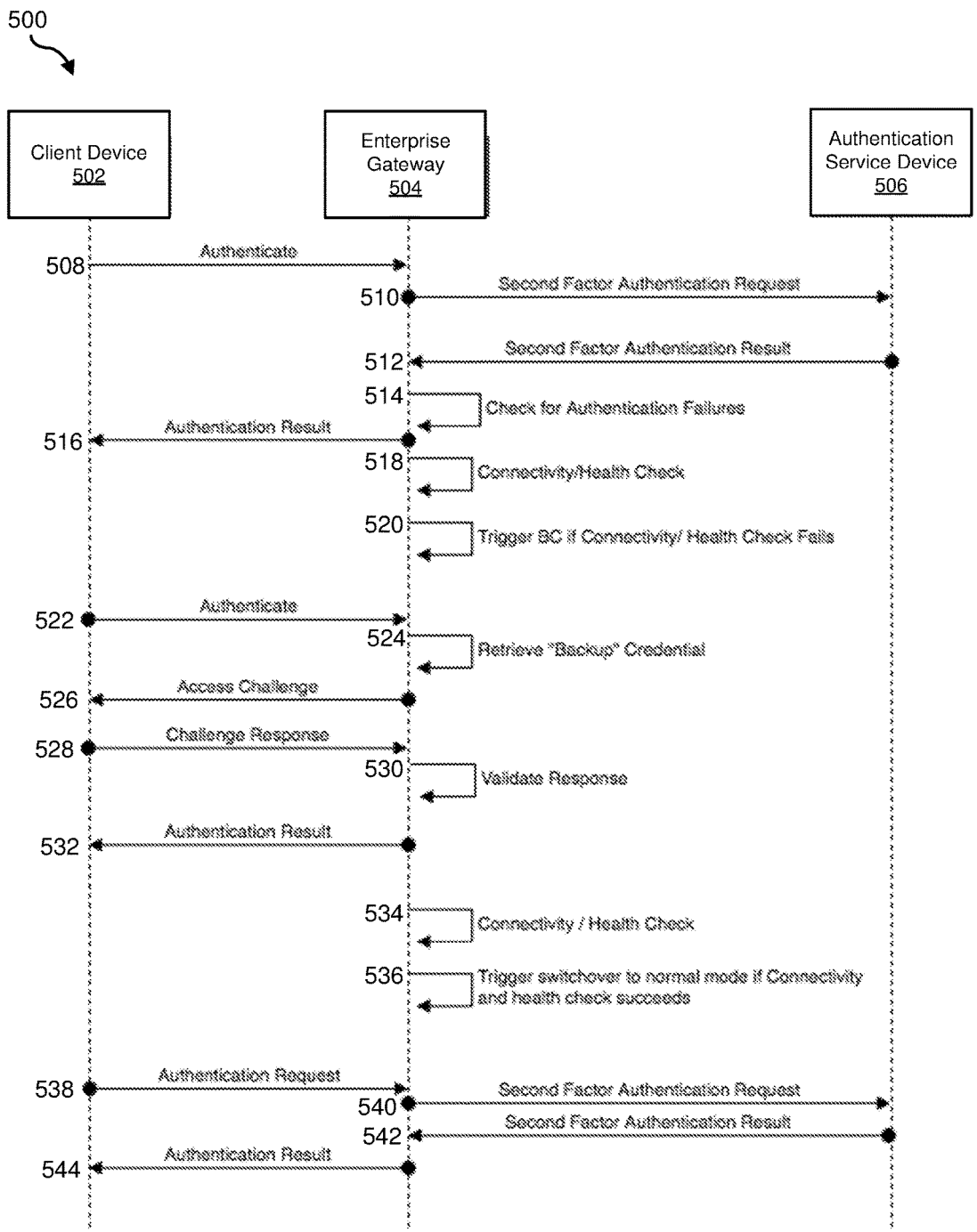
FIG. 5 is a flow diagram of an example, method for authenticating a user with a backup credential when an authentication server is unavailable.

FIG. 5 is a flow diagram 500 of an example, method for authenticating a user with a backup credential when an authentication server is unavailable. In examples, flow diagram 500 may authenticate with the backup credential only when the authentication server is unreachable and via inline-challenge-based authentication for a one-time password created from the backup credential. In some examples, flow diagram 500 may represent a second stage of a two-stage method for providing two-factor authentication with an enterprise gateway when an authentication server is unavailable. In some examples, flow diagram 500 may represent a second stage of a two-stage method for providing two-factor authentication with an enterprise gateway when an authentication server is unavailable.

As shown in FIG. 5, flow diagram 500 may include a client device 502 in communication with an enterprise gateway 504. Enterprise gateway 504 may also be coupled to an authentication service device 506. In examples, all or a portion of client device 502 may be performed by computing device 202 client device 402, and/or any other suitable computing system. In one example, all or a portion of the functionality of enterprise gateway 504 may be performed by server 206, enterprise gateway 404, and/or any other suitable computing system. In some embodiments, all or a portion of the functionality of authentication service device 506 may be performed by authentication server 208, authentication service device 406, and/or any other suitable computing system. In one example, all or a portion of the functionality of modules 102 may be performed by enterprise gateway 504 and/or any other suitable computing system. As will be described in greater detail herein, one or more of modules 102 from FIG. 1 may, when executed by at least one processor of enterprise gateway 504 to providing two-factor authentication with an enterprise gateway when an authentication server is unavailable.

As illustrated in FIG. 5, steps 508 to 518 depict a normal mode of operation when authentication service device 506 is available.

At step 508, client device 502 may send an authentication request, including a security code, to enterprise gateway 504.

At step 510, enterprise gateway 504 may send an authentication request, including the security code, to authentication service device 506. Authentication service device 506 may validate the authentication request, which provides a strong authentication of a user attempting to access client device 502.

At step 512, authentication service device 506 may send authentication confirmation to enterprise gateway 504.

At step 514, enterprise gateway 504 may check for authentication failures.

At step 516, in response to finding no authentication failures, enterprise gateway 504 may send authentication confirmation to client device 502.

At step 518, enterprise gateway 504 may check for access to authentication service device 506.

As illustrated in FIG. 5, steps 520 to 536 depict a failure mode of operation when authentication service device 506 is unavailable.

At step 520, in response to authentication service device 506 being unavailable, enterprise gateway 504 may trigger a failure mode, such as a business continuity mode. In some examples, while in failure mode, enterprise gateway 504 may continue to check connectivity to a cloud service and to check an availability of authentication service device 506.

At step 522, client device 502 may send an authentication request, including a security code, to enterprise gateway 504.

At step 524, when there is an authentication request from a user during failure mode, enterprise gateway 504 may check if a backup credential is bound to a user account associated with the authentication request. In some examples, enterprise gateway 504 checks a local database to determine if a backup credential is bound to a user account associated with the authentication request.

At step 526, when a user has a bound backup credential, enterprise gateway 504 sends an access challenge to client device 502, with a challenge to enter the security code generated from the backup credential. In some examples, the challenge is sent via an out-of-band channel short message system, a voice channel, or via email. In some embodiments, the security code is a one-time password.

At step 528, in response to the challenge, client device 502 may send a response to enterprise gateway 504.

At step 530, the response to the access challenge may be validated by enterprise gateway 504. User access may be provided based on strong authentication result.

At step 532, when authentication is successful, enterprise gateway 504 may send an authentication result to client device 502.

At step 534, while in failure mode, enterprise gateway 504 may check for access to authentication service device 506. This check may occur at a regular interval.

At step 536, in response to authentication service device 506 being available, enterprise gateway 504 may reenter normal mode.

As illustrated in FIG. 5, steps 538 to 544 depict a normal mode of operation when authentication service device 506 is available.

At step 538, client device 502 may send an authentication request, including a security code, to enterprise gateway 504.

At step 540, enterprise gateway 504 may send an authentication request, including the security code, to authentication service device 506. Authentication service device 506 may validate the authentication request, which may provide strong authentication of a user attempting to access client device 502.

At step 542, authentication service device 506 may send authentication confirmation to enterprise gateway 504.

At step 544, enterprise gateway 504 may send authentication confirmation to client device 502.

Figure 6:
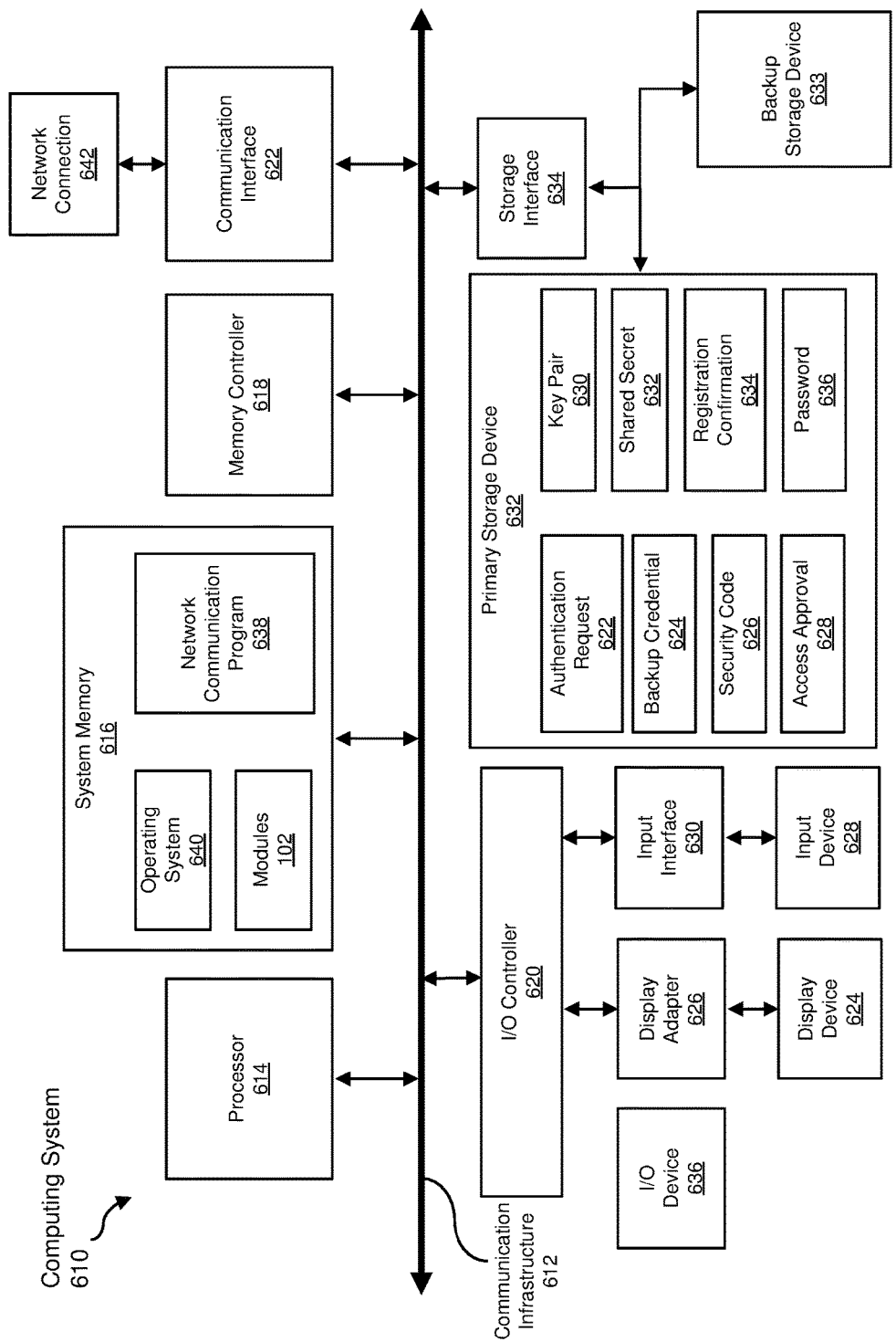
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, authentication request 122, backup credential 124, security code 126, access approval 128, key pair 130, shared secret 132, registration confirmation 134, and/or password 136] from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
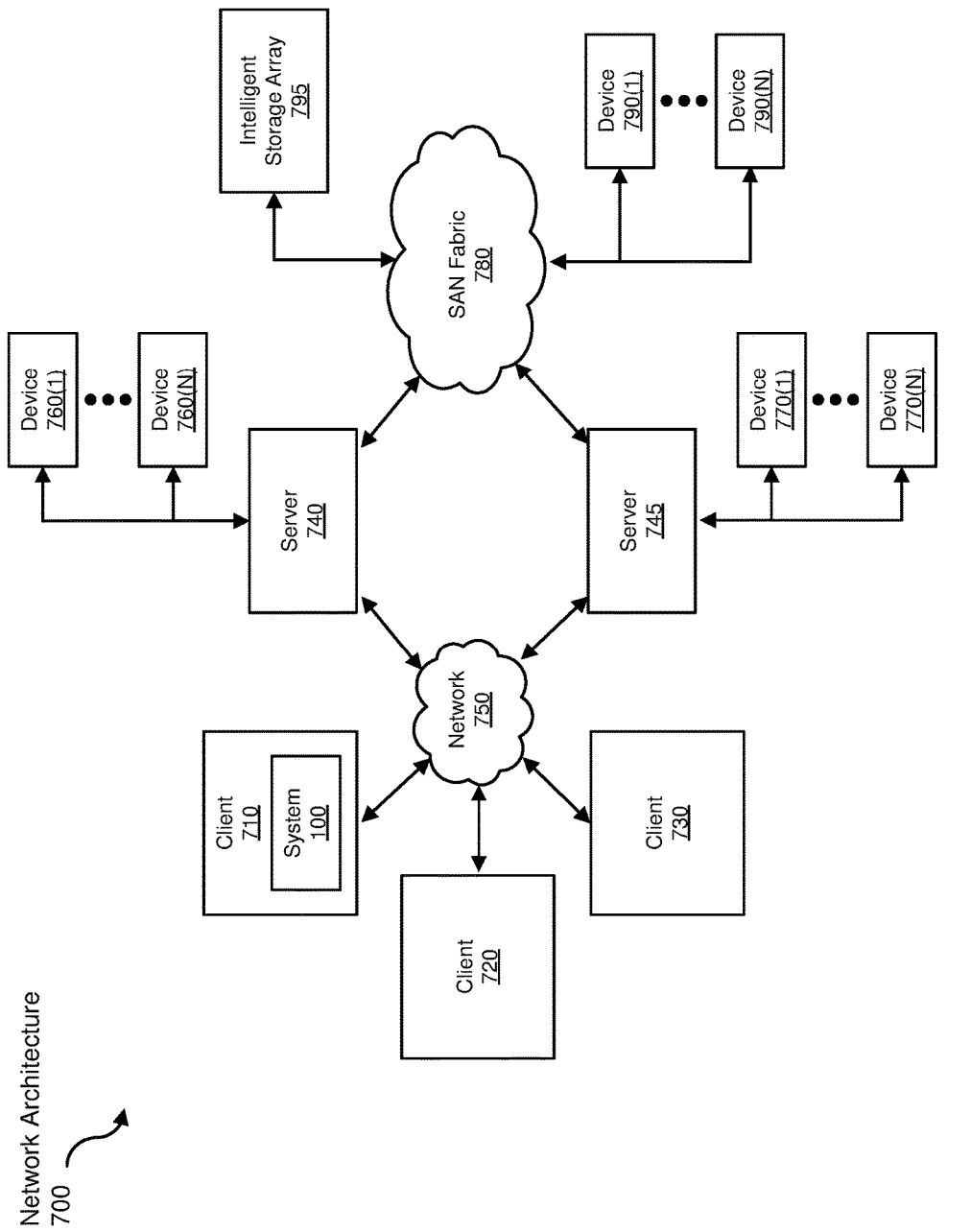
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for providing two-factor authentication with an enterprise gateway when an authentication server is unavailable.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures may be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and may be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive security code data to be transformed, transform the security code data, output a result of the transformation to a client device, use the result of the transformation to authenticate the security code data, and store the result of the transformation to enable approving access to the client device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for providing two-factor authentication with an enterprise gateway when an authentication server is unavailable, at least a portion of the method being performed by a computing device comprising at least one processor, the method comprising:
 receiving, at the computing device, an authentication request from a client device;
 determining the authentication server is unavailable;
 sending, to the client device and in response to determining the authentication server is unavailable, a backup credential stored on the enterprise gateway;
 receiving, from the client device, a security code generated by the backup credential;
 authenticating the security code; and
 sending, in response to determining the security code is authentic, access approval to the client device.

2. The method of claim 1, further comprising checking availability of the authentication server.

3. The method of claim 2, further comprising switching, in response to determining the authentication server is available, to using the authentication server for authentication.

4. The method of claim 1, wherein sending the backup credential to the client device includes sending the backup credential via an out-of-band channel.

5. The method of claim 1, further comprising, when the authentication server is available and prior to unavailability of the authentication server:
receiving a key pair from the authentication server;
determining that the backup credential is not bound to the client device;
sending a request for the backup credential to the authentication server, wherein the request includes a shared secret encrypted with the key pair;
receiving confirmation that the backup credential is registered; and
storing the backup credential.

6. The method of claim 5, further comprising registering the credential at the authentication server, wherein registering the backup credential includes:
decrypting the shared secret using the key pair;
sending, to a mobile device, an authentication message with an option to grant or deny the backup credential;
receiving a response, from the mobile device, indicating acceptance of the backup credential;
registering the backup credential; and
sending, to the enterprise gateway, the confirmation that the backup credential is registered.

7. The method of claim 5, further comprising using a password to encrypt the shared secret and deriving the key pair from the password.

8. The method of claim 1, further comprising:
identifying, in response to the authentication request from the client device, a potential security risk associated with the authentication request; and
performing, in response to identifying the potential security risk, a security action in an attempt to ameliorate the potential security risk.

9. A system for providing two-factor authentication with an enterprise gateway when an authentication server is unavailable, the system comprising:
a memory device;
a first receiving module, stored in the memory device, that receives, at a computing device, an authentication request from a client device;
a determining module, stored in the memory device, that determines the authentication server is unavailable;
a first sending module, stored in the memory device, that sends, to the client device and in response to determining the authentication server is unavailable, a backup credential stored on the enterprise gateway;
a second receiving module, stored in the memory device, that receives, from the client device, a security code generated by the backup credential;
an authenticating module, stored in the memory device, that authenticates the security code;
a second sending module, stored in the memory device, that sends, in response to determining the security code is authentic, access approval to the client device; and
at least one physical processor that executes the first receiving module, the determining module, the first sending module, the second receiving module, the authenticating module, and the second sending module.

10. The system of claim 9, further comprising a checking module, stored in the memory device, that checks availability of the authentication server.

11. The system of claim 10, further comprising a switching module, stored in the memory device, that switches, in response to determining the authentication server is available, to using the authentication server for authentication.

12. The system of claim 9, wherein the sending module sends the backup credential via an out-of-band channel.

13. The system of claim 9, further comprising:
a third receiving module, stored in the memory device, that receives a key pair from the authentication server when the authentication server is available and prior to unavailability of the authentication server;
a second determining module, stored in the memory device, that determines that the backup credential is not bound to the client device;
a third sending module, stored in the memory device, that sends a request for the backup credential to the authentication server, wherein the request includes a shared secret encrypted with the key pair;
a fourth receiving module, stored in the memory device, that receives confirmation from the authentication server that the backup credential is registered; and
a storing module, stored in the memory device, that stores the backup credential.

14. The system of claim 13, further comprising a password module, stored in the memory device, that uses a password to encrypt the shared secret and derive the key pair from the password.

15. The system of claim 9, further comprising:
an identifying module, stored in the memory device, that identifies, in response to the authentication request from the client device, a potential security risk associated with the authentication request; and
a performing module, stored in the memory device, that performs, in response to identifying the potential security risk, a security action in an attempt to ameliorate the potential security risk.

16. A non-transitory computer-readable medium comprising one or more computer-executable instructions that, when executed by at least one processor of a computing device, cause the computing device to:
receive, at the computing device when an authentication server is unavailable, an authentication request from a client device;
determine the authentication server is unavailable;
send, to the client device and in response to determining the authentication server is unavailable, a backup credential stored on the enterprise gateway;
receive, from the client device, a security code generated by the backup credential;
authenticate the security code; and
send, in response to determining the security code is authentic, access approval to the client device.

17. The non-transitory computer-readable medium of claim 16, further comprising one or more computer-executable instructions that, when executed by the at least one processor of the computing device, cause the computing device to:
check availability of the authentication server; and
switch, in response to determining the authentication server is available, to using the authentication server for authentication.

18. The non-transitory computer-readable medium of claim 16, wherein the one or more computer-executable instructions that, when executed by the at least one processor of the computing device, cause the computing device to send the backup credential to the client device further comprise one or more computer-executable instructions that, when executed by the at least one processor of the computing device, cause the computing device to send the backup credential via an out-of-band channel.

19. The non-transitory computer-readable medium of claim 16, further comprising one or more computer-executable instructions that, when executed by the at least one processor of the computing device, cause the computing device to:
  receive, when the authentication server is available and prior to unavailability of the authentication server, a key pair from the authentication server;
  determine that the backup credential is not bound to the client device;
  send a request for the backup credential to the authentication server, wherein the request includes a shared secret encrypted with the key pair;
  receive confirmation that the backup credential is registered; and
  store the backup credential.

20. The non-transitory computer-readable medium of claim 16, further comprising one or more computer-executable instructions that, when executed by the at least one processor of the computing device, cause the computing device to:
  identify, in response to the authentication request from the client device, a potential security risk associated with the authentication request; and
  perform, in response to identifying the potential security risk, a security action in an attempt to ameliorate the potential security risk.

\* \* \* \* \*